May 7, 1929. L. WOLF 1,711,665
TORCH
Filed Nov. 2, 1925
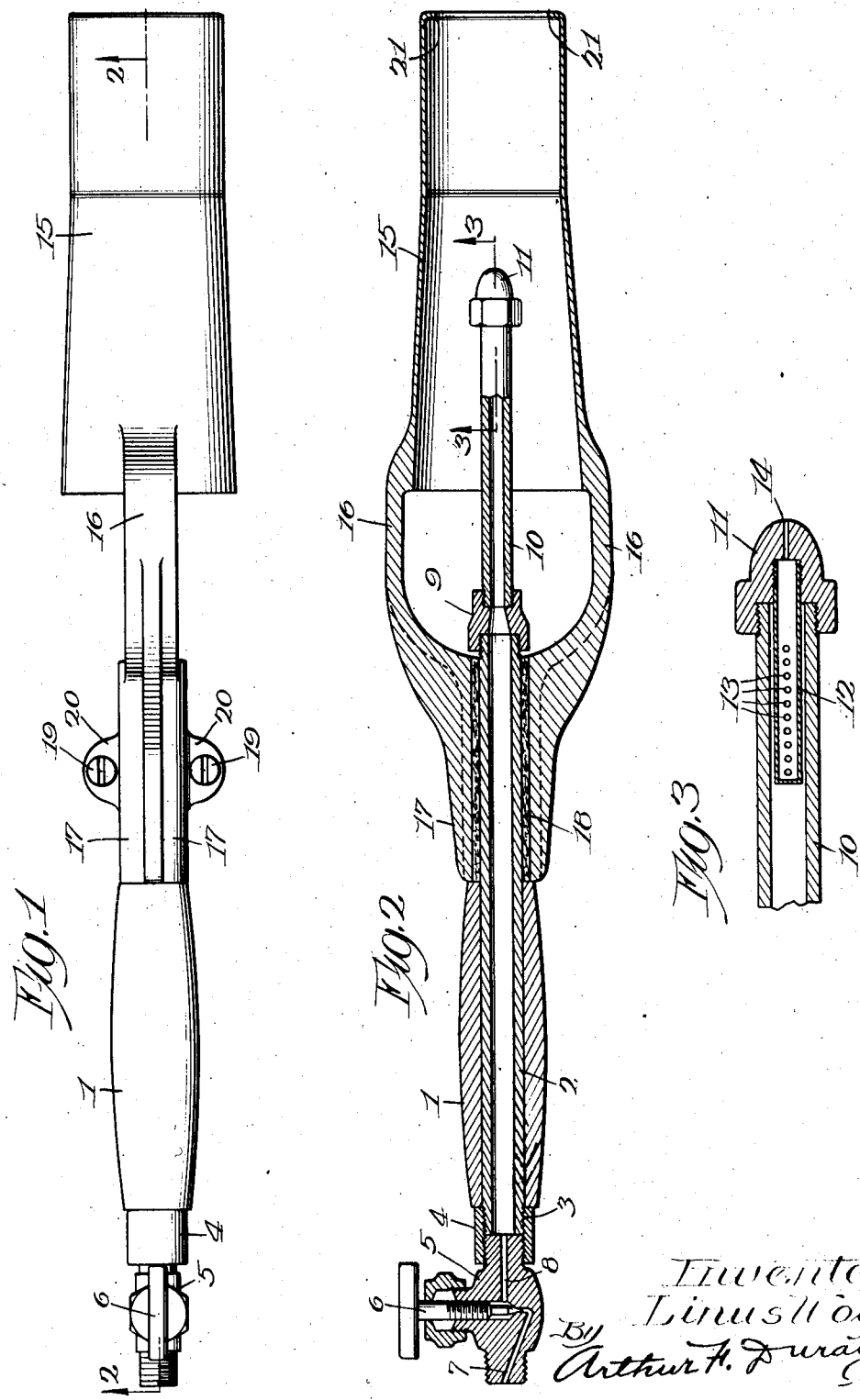

Patented May 7, 1929.

1,711,665

UNITED STATES PATENT OFFICE.

LINUS WOLF, OF KANKAKEE, ILLINOIS.

TORCH.

Application filed November 2, 1925. Serial No. 66,177.

This invention relates to torches for various purposes, such as blow torches using gas of a suitable character to produce the desired flame.

Generally stated, the object of the invention is to provide a novel and improved construction of blow torch, having novel elements and features of construction tending to improve the action and efficiency of the torch, and to render the same more safe in use.

It is also an object to provide certain details and features of construction and combinations tending to increase the general efficiency and the desirability of a blow torch of this particular character.

To these and other useful ends, the invention consists of matters hereinafter set forth and claimed and shown in the accompanying drawings, in which:

Fig. 1 is a side elevation of a blow torch embodying the principles of the invention.

Fig. 2 is a longitudinal section on line 2—2 in Fig. 1.

Fig. 3 is an enlarged detail longitudinal section on line 3—3 in Fig. 2.

As thus illustrated, the invention comprises a handle 1 having a hollow member or tube 2 fixed therein, the rear end of the tube being threaded at 3, and a collar or coupling 4 being in engagement therewith to couple the valve body 5 thereto. This valve body has a needle valve 6, and the gas, of any suitable character, from any suitable source, is conducted through the passage 7 past the point of the needle valve, then through the passage 8 to the tube 2 extending longitudinally through the handle. The reducer coupling 9 connects the threaded outer end of the tube 2 with a smaller tube 10, which latter has a discharge tip or nozzle 11 screwed upon its outer end. A relatively short tube 12 having its inner end closed and its outer end threaded into the tip or nozzle 11 is provided laterally with openings 13, within the bore of the tube 10, so that the gas or gaseous mixture of any suitable character must pass from the tube 10, through the openings 13 to the interior of the tube 12, before escaping through the final discharge passage or orifice 14 formed in the end of the nozzle 11 as shown. Thus dirt and other impurities are held back and kept from clogging the small discharge passage 14, in a manner that will be readily understood, the laterally apertured tube 12 serving as a sort of filter or screen for this purpose.

The mixing nozzle 15 is in the nature of a comparatively large tube as shown, having rearward extending arms 16 provided with grooved jaws 17 to clamp the tube 2, a sleeve 18 of asbestos being interposed between said jaws and the said tube. Stove bolts 19 are inserted through the lugs or ears 20 formed on the sides of said jaws, whereby tube 2 and its covering 18 of asbestos are firmly clamped in place as shown. The outer end of the mixing nozzle 15 is flanged and bent inwardly at 21.

Thus the elements when combined, formed as described, form a blow torch for use in any desired manner. The asbestos 18 prevents the heat of the flame from being transmitted back through the nozzle 15 and the arm 16 and the jaws 17 to the tube 2, and prevents the latter from being heated. The flange 21 tends to prevent the flame from jumping and insures proper mixture between the end of tip 11 and the outlet of the mixing nozzle 15, and as previously explained, the tube 12 tends to prevent impurities from passing outwardly into the flame and serves as a filter or screen for this purpose. Furthermore, the mixing nozzle 15 is long enough to insure proper mixing of the gas and air for complete combustion, whereby the flame is a distance from the tip 11 and will not tend to flash back, and will not heat the tip, thus resulting in longer life of the torch.

Any suitable gas can be employed, or mixture of gases, and the invention is not limited to any particular kind of gas or mixture of gases, nor to any particular use of the torch, as it may be used in various ways and for various purposes without departing from the spirit of the invention.

It will be understood, of course, that the mixing tube 15 is open at both ends thereof, so that air enters between the arm 16 and passes through the nozzle 15 where it is mixed with the gas discharged from the orifice 14 of the tube 11, whereby the mixture of gas and air is then discharged from the outlet of the mixing nozzle, which outlet is restricted by the flange 21 previously mentioned, as shown and described, and for the purposes set forth.

Without disclosing anything, and without prejudice to any novelty disclosed, what I claim as my invention is:

1. In a blow torch, the combination of a handle, a feed nozzle having a tip, suitably connected to a source of gas supply through said handle, a mixing nozzle enclosing said tip, said mixing nozzle being open at both ends thereof, a reducer coupling in an open space between said mixing nozzle and the handle and supporting said feed nozzle, and means separate from said reducer and rigidly connecting said mixing nozzle with said handle, said tip being located between the two ends of the mixing nozzle, thereby forming a blow torch, said coupling being rotatable and removable and permitting removal of said entire feed nozzle if necessary or desirable without disconnecting the mixing nozzle from the handle.

2. In a blow torch, the combination of a handle, a tip connected through the handle with a source of gas supply, and a mixing nozzle enclosing said tip, with means integral with said mixing nozzle and divided longitudinally and forming clamping jaws to removably mount the mixing nozzle on the connection between the tip and the handle, with tubular insulation interposed between said means and connection, thereby to prevent heat from the mixing nozzle from heating the gas passage between the tip and the source of supply.

3. In a blow torch, the combination of a tip and a source of gas supply connected thereto, and a mixing nozzle enclosing the tip, said nozzle having a straight cylindrical outer end portion formed with an inturned right-angle annular flange at its outlet, to provide a restricted round outlet for the nozzle, tending to prevent jumping of the flame, and to insure proper mixture between the tip and the outlet of the nozzle, and having a funnel shaped inlet portion tapering into said cylindrical portion, the tip being disposed within the tapering portion.

4. In a blow torch, the combination of a handle and gas nozzle tip, with an accessible reducer coupling forming part of a connection between the tip and handle, a mixing nozzle enclosing the tip, and means independent of said coupling rigidly connecting the mixing nozzle with said handle, so that said tip can be removed if necessary or desirable without disconnecting said mixing nozzle from said handle, with the outlet of said mixing nozzle some distance from the tip, thereby assuring complete combustion, and whereby the flame is a distance from the tip, to prevent the flame from flashing back, and to prevent heating of the tip, thereby to insure longer life of the torch.

Specification signed this 28th day of October, 1925.

LINUS WOLF.